United States Patent [19]

Hill

[11] Patent Number: 5,526,708
[45] Date of Patent: Jun. 18, 1996

[54] INTERCHANGEABLE ENGINE MOUNTING

[76] Inventor: James W. Hill, 10 Rasor Dr., Greenville, S.C. 29609

[21] Appl. No.: 313,381

[22] Filed: Sep. 27, 1994

Related U.S. Application Data

[63] Continuation-in-part of Ser. No. 79,883, Jun. 23, 1993, Pat. No. 5,357,818.

[51] Int. Cl.$^6$ .............................. F16M 13/00; H02K 5/00
[52] U.S. Cl. .............................. 74/16; 192/65; 192/69.8; 192/69.9; 192/103 B; 248/646; 248/658; 310/75 D; 310/91; 403/14
[58] Field of Search ............................ 74/16; 108/143; 24/402.03, 402.08; 312/349; 403/331, 14, 353, 306; 310/91, 75 D; 248/221.3, 223.4, 646, 657, 658, 676, 680, 681; 192/69, 69.9, 69.8, 65, 103 B; 29/434, 464

[56] References Cited

U.S. PATENT DOCUMENTS

| | | |
|---|---|---|
| 963,755 | 7/1910 | Forslund . |
| 1,707,203 | 3/1929 | Thornley . |
| 2,028,282 | 1/1936 | Hoe . |
| 2,881,519 | 4/1959 | Gardner . |
| 2,904,804 | 9/1959 | Odessey ............................ 192/69.8 X |
| 3,019,709 | 2/1962 | Teason . |
| 3,941,002 | 3/1976 | Tucker, Jr. . |
| 4,446,679 | 5/1984 | Thomas . |
| 4,501,332 | 2/1985 | Straayer . |
| 4,597,203 | 7/1986 | Middleton . |
| 4,615,117 | 10/1986 | Flath . |
| 4,757,786 | 7/1988 | Ellegard . |
| 4,976,637 | 12/1990 | Newell et al. . |
| 4,989,323 | 2/1991 | Casper et al. . |

FOREIGN PATENT DOCUMENTS

| | | |
|---|---|---|
| 493956 | 6/1953 | Canada . |
| 869687 | 3/1953 | Germany . |

*Primary Examiner*—Allan D. Herrmann
*Attorney, Agent, or Firm*—Richard C. Litman

[57] ABSTRACT

An adapter for rapid attachment and removal of a flanged motor on a power driven appliance. A bracket attaches to the appliance and cooperatively receives the motor flange. Pins incorporating clips or expanding projections then secure the motor to the appliance. A shaft-to-shaft connector is then secured in place on the shafts, thus coupling the motor output shaft and appliance power input shaft. The connector may include pins inserted through aligned bores in the connector and the shafts. In a preferred embodiment, the connector may comprise mating forward and rear components sandwiching a resilient member therebetween, which arrangement accommodates minor angular and parallel misalignment. In other alternative embodiments, the connector comprises a splined collar slidable over splined output and input shafts, and a clutch and drum arrangement. For belt driven appliances, the motor output shaft terminates in a pulley, or is coupled to a shaft having a pulley and attached to the appliance. Optionally, a belt tensioning pulley is included.

10 Claims, 4 Drawing Sheets

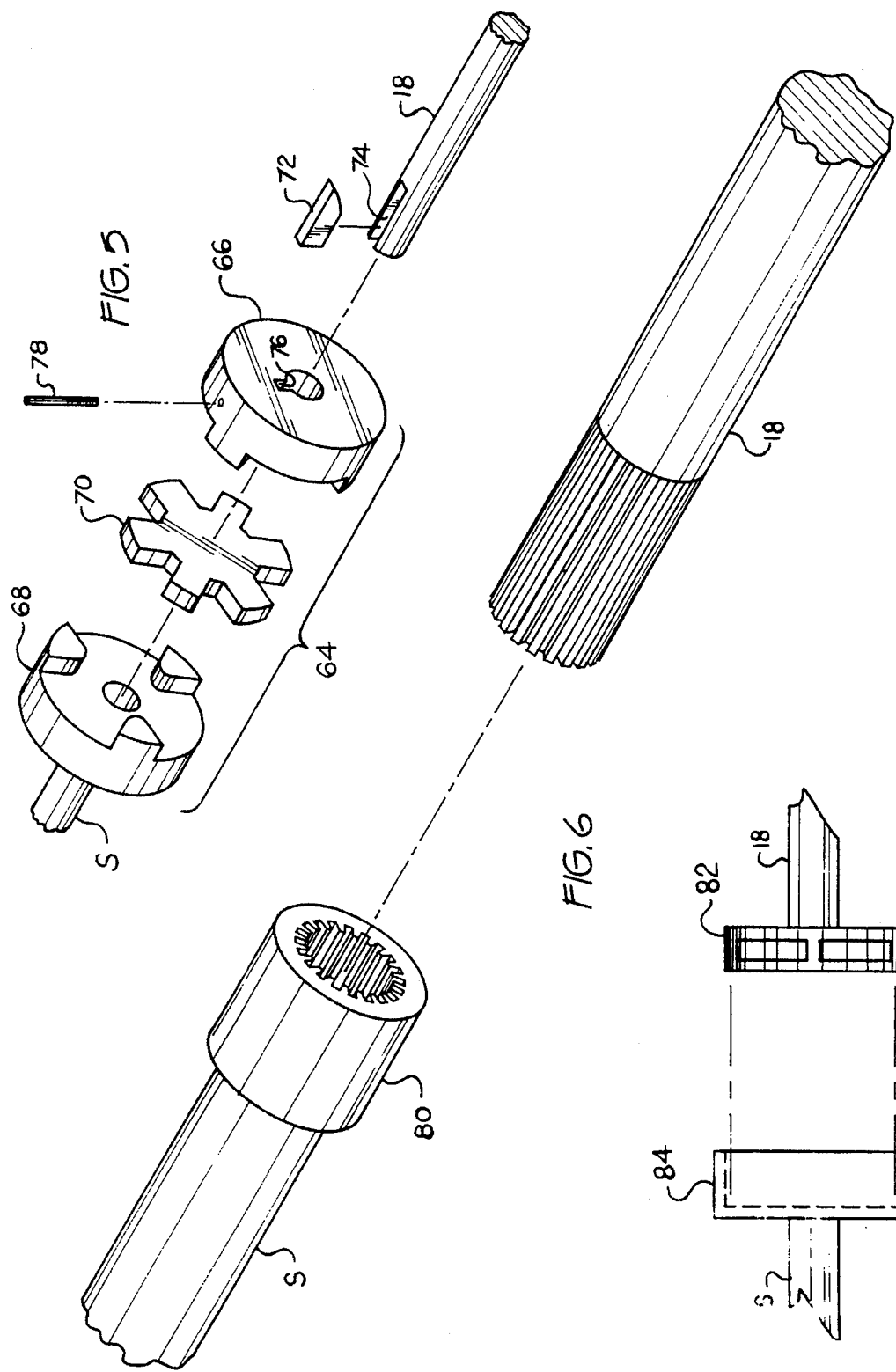

INTERCHANGEABLE ENGINE MOUNTING

CROSS REFERENCE TO RELATED APPLICATION

This is a Continuation-in-Part of application Ser. No. 08/079,883, filed Jun. 23, 1993, U.S. Pat. No. 5,357,818.

BACKGROUND OF THE INVENTION

1. Field of the Invention

The present invention relates to apparatus for detachably attaching a small motor to any one of a number of appliances which can be driven by that motor.

2. Description of the Prior Art

Supplying motorized power selectively to plural motor driven appliances has been contemplated in the prior art. An example of attaching an additional appliance onto another is seen in U.S. Pat. No. 4,597,203, issued to Carlisle A. Middleton on Jul. 1, 1986. Middleton modifies a basic snowblower to include any of several appliances to be added to the basic structure in piggyback style. Most, if not all, of the original structure is retained, only the power output being necessary for the new purposes.

Another example of utilizing a complete appliance only for power, the basic structure being attached to a new appliance, is seen in U.S. Pat. No. 4,446,679, issued to Perry W. Thomas on May 8, 1984. A relatively unmodified lawnmower is mounted atop another appliance, and, again, only the power output is utilized.

It has also been proposed to change the function of a specific powered appliance by substituting a new working head for the original. Examples include U.S. Pat. Nos. 2,881,519, issued to Donald B. Gardner on Apr. 14, 1959; 4,501,332, issued to Robert O. Straayer on Feb. 26, 1985; 4,976,637, issued to William K. Newell et al. on Dec. 11, 1990, and 4,989,323, issued to Kim P. Casper et al. on Feb. 5, 1991. In these four examples, a hand carried, gasoline powered appliance is provided with a tool or working head for accomplishing a new purpose.

In U.S. Pat. No. 4,615,117, issued to Ronald Flath on Oct. 7, 1986, a chain saw is modified to be able to power, selectively, plural devices. However, the resultant power plant is limited to applications wherein the chain and its connection to the motor are retained, and direct connection between the motor and a driven appliance is not easily accomplished.

U.S. Pat. No. 4,757,786, issued to Sidney W. Ellegard on Jul. 19, 1988, illustrates a detachable engine mounting suitable for driving large appliances. The manual attachment scheme employed by Ellegard differs in structure with the present invention.

None of the above inventions and patents, taken either singly or in combination, is seen to describe the instant invention as claimed.

SUMMARY OF THE INVENTION

While interchangeability or ready attachment and detachment of motors generally has been addressed in the prior art, it remains the focus of the present invention to provide interchangeable engine mounting within a particular context. That is, motors having power within the range of one-half horsepower (one-third kilowatt) to ten horsepower (seven and one-half kilowatts), as employed to drive large appliances. Large appliances are those which, by virtue of size or function, are wheeled, if mobile, or stationary, and could include pumps, generators, air compressors, circular saws, log splitters, snow blowers, small tractors and similar garden appliances, among still others.

The present invention provides an arrangement wherein a motor is rapidly set in place on a powered appliance, anchored in this location, and connected to the appliance.

The invention includes, in its essence, structure for guiding the motor into operative position; attachments locking the motor in the operative position; and a manually removable coupling for connecting the two shafts. The guiding function is important to the invention, in that it enables rapid placement of the motor in operative position on the appliance with no effort by the user to assure precision in spotting motor location. The motor is moved linearly into its operative position, and secured there by structure which prevents any movement of the motor except along the linear path by which it was set in place.

The securing structure also prevents potentially damaging contact of the motor with the appliance, in particular preventing shaft to shaft collision. The locking attachments are then employed to prevent movement of the motor out of the operative position along this path. Finally, power transmission is assured by coupling the two shafts together.

To this end, the invention includes a bracket fixed to the appliance, which engages a cooperating flange secured to the motor. The bracket enables sliding the motor into place, and prevents rotation of the motor about the axis of the output shaft, and also prevents movement of the motor in two orthogonal axes. Only movement along the axis of the motor output shaft is permitted. The bracket also provides a final stop preventing collision with the input device of the appliance.

The input device of the appliance is customarily a rotatable shaft. In a second embodiment of the invention, the input device is a shaft connected to a pulley.

The flanged motor is placed into the bracket, and secured thereto by spring biased pins. These pins prevent the motor from withdrawing from its proximity to the appliance input shaft.

The motor output shaft is coupled to the appliance input shaft by a connector designed to connect coaxial shafts. The connector, which is preferably any one of several connectors commercially available as prefabricated units, is arranged to cooperate with the two shafts and to transmit rotary motion from the motor shaft to the appliance shaft.

Cooperation between the shafts is provided by a circumferentially surrounding member, hereinafter termed a collar, which fits concentrically over the motor output shaft and the appliance input shaft. In one embodiment, the collar surrounds a drum fixed to a shaft. The collar has structure providing interference between itself and the shaft or shaft member, so that rotation of the shaft is passed on to the collar. The driven shaft is rotated by passing on rotation of the collar by the same interfering arrangement.

In the preferred embodiment, the collar connector is a collar which comprises separate collar members and an intermediate cushioning member sandwiched therebetween. The cushioning member absorbs vibration, torque, and the like, and accommodates angular and parallel misalignment. Coupling shafts in this fashion is desirable because it obviates the need for extreme precision in locating the motor mounting components such that the input and output shafts would have to align almost perfectly.

In a second embodiment, one shaft is connected to a centrifugal clutch, and the other shaft is connected to a collar having a cylindrical inner wall. The collar concentrically surrounds the clutch. Under predetermined conditions, a member of the clutch projects radially therefrom, and contacts the collar inner wall. Friction between the clutch member and the collar inner wall provides the necessary interference to drive one shaft from the other shaft.

In still another embodiment, the collar and the two shafts are splined. The collar overlaps both shafts, and the splines provide the interference.

The invention is also employed with belt driven appliances. In these cases, the appliance input shaft terminates in a pulley, but is driven from the motor output shaft as described above. A belt tensioning device is optionally provided for clutching as well as to control belt slippage or dislocation.

Accordingly, it is a principal object of the invention to provide an interchangeable engine mounting which enables a motor to be readily installed and removed on a motor driven appliance manually, or with minimal use of hand tools.

It is another object of the invention to provide securement for a readily installed and removed motor which positively constrains the motor against rotation about the axis of the motor power output shaft, and also constrains the motor against withdrawal from its operative position.

It is a further object of the invention to provide a bracket into which the flange moves in a linear fashion.

Still another object of the invention is to provide a readily installed and removed motor for use with a belt driven appliance.

An additional object of the invention is to provide a readily installed and removed motor which provides belt tensioning, whereby power is selectively connected and disconnected to the appliance while the motor continues to run.

It is still an additional object of the invention to provide a connection between a motor output shaft and an appliance input shaft which is secured by connectors accommodating angular and parallel misalignment of the two coupled shafts.

It is still another object of the invention to arrest motion of the motor when being set in place prior to abutment with the appliance input shaft.

It is again an object of the invention to connect the motor output shaft to the appliance input shaft by a collar arrangement. A further object of the invention is to transmit rotary power to the collar by friction or interference.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIGS. 5, 6, and 7 are perspective detail views of alternative embodiment connectors for coupling the motor output shaft to the appliance input shaft, drawn to enlarged scale.

Similar reference characters denote corresponding features consistently throughout the attached drawings.

DETAILED DESCRIPTION OF THE PREFERRED EMBODIMENTS

Figure 1:
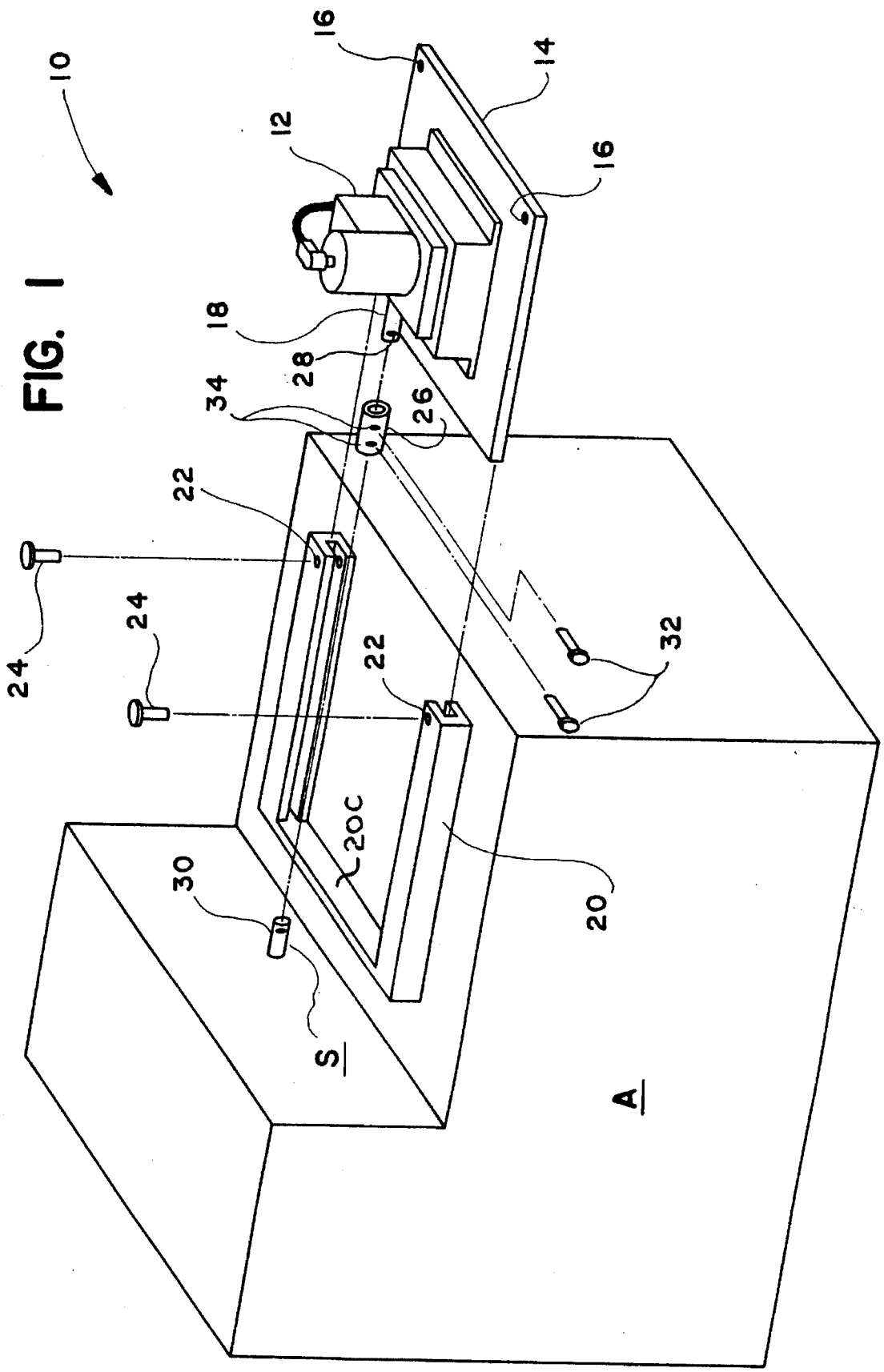
FIG. 1 is a perspective, partially exploded, diagrammatic, environmental view of the present invention.

Referring first to FIG. 1, a first embodiment of the novel interchangeable engine mounting 10 is seen, wherein a driven appliance A has an input shaft S for receiving rotary power. A removable motor 12 is provided with a mounting flange 14 having two holes 16, 16 and with an output shaft 18 extending toward appliance A, output shaft 18 preferably aligning with input shaft S. Of course, motor 12 will be understood to include conventional motor starting means and controls (neither shown).

Secured to appliance A is a bracket 20, which is formed to surround flange 14. Bracket 20 has two holes 22, 22 which will align with respective flange holes 16, 16, so that when motor 12 is in its operable position, alignment will enable pins 24, 24 to be inserted therein. Motor 12 is now secured in place.

Bracket 20 must enable linear movement of motor 12 in place, and in this respect, need include only parallel legs 20A, 20B. The invention requires that a stop or interference be provided, to assure that motor 12 not actually collide with appliance A. In particular, injurious impact of motor output shaft 18 with appliance A is avoided by the stop. To avoid the necessity of providing and locating a separate stop, bracket 20 includes a rear wall 20C for arresting movement of motor 12 as it is slid into place on appliance A.

A collar 26, which has been slipped over either input shaft S or output shaft 18, is positioned to overlap radial throughbores 28 and 30, formed respectively in motor output shaft 18 and appliance input shaft S. Pins 32, 32 are then inserted through holes 28, 30 and holes 34, 34 formed in collar 26. Output shaft 18 and input shaft S are now coupled. When motor 12 is started, appliance A will be operable.

Alternatively, any of several well-known types of commercially available shaft couplers (not shown) may be substituted for collar 26. Examples include flexible and chain type couplers. Also, collar 26 may engage shafts 18 and S by setscrews rather than by pins which penetrate collar 26 and shafts 18 and S.

Figure 2:
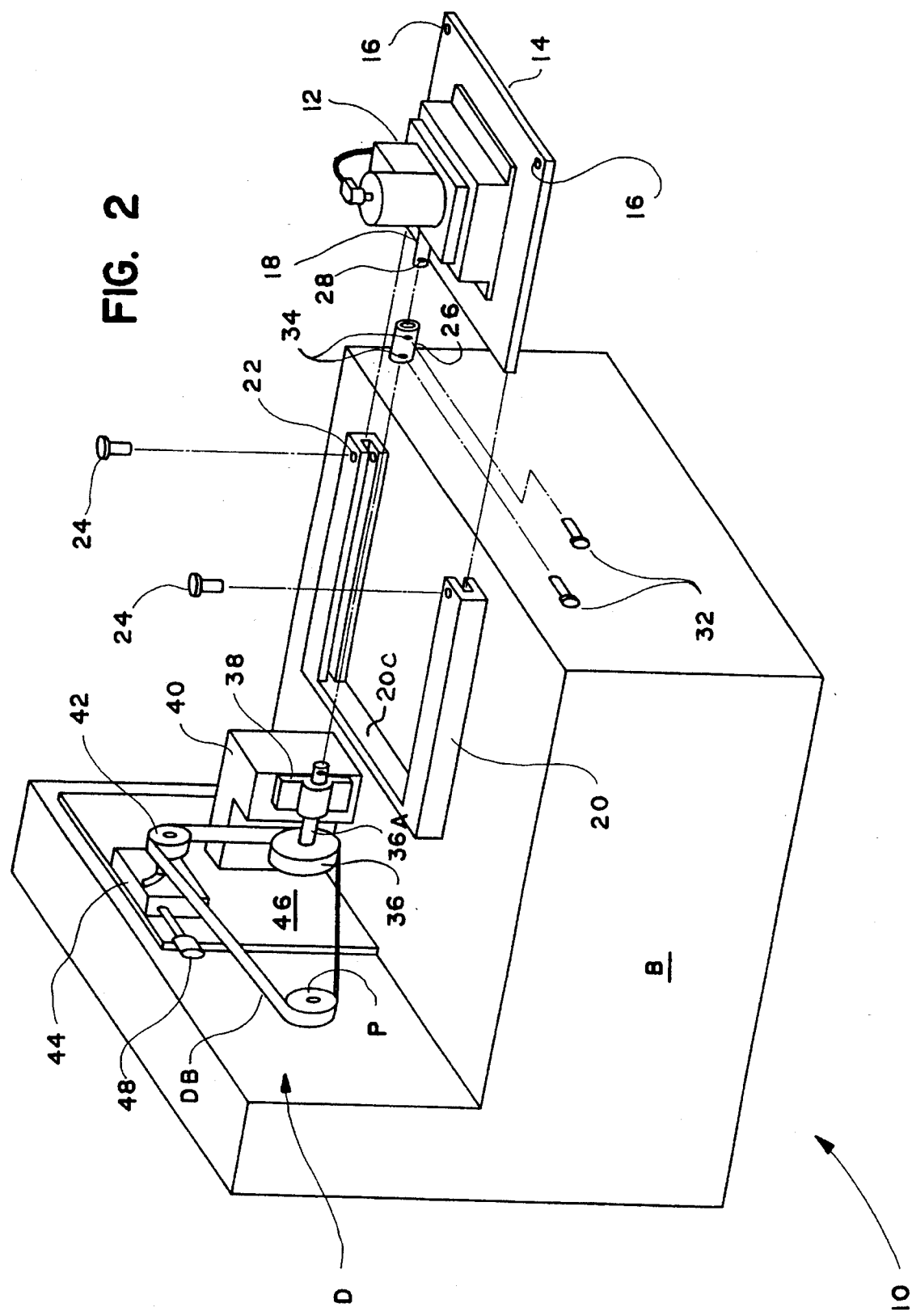
FIG. 2 is a perspective, partially exploded, diagrammatic, environmental view of an alternative embodiment of the present invention.

Turning now to FIG. 2, a second embodiment of the interchangeable engine mounting 10 is shown wherein an appliance B has a belt drive D. In this situation, the appliance input shaft (not shown) has an input pulley P which must operably engage drive belt DB.

The same flanged motor 12 and bracket 20 from the first embodiment are installed as previously discussed. A drive pulley 36, supported on its shaft 36A in a pillow block bearing 38 secured to a bearing bracket 40, is positioned to engage drive belt DB. In this embodiment, motor output shaft 18 is coupled to pulley shaft 36A with collar 26 and pins 32, 32, as previously discussed. This arrangement renders a single motor attachable to both shaft driven and belt driven appliances.

For those applications requiring constant motor operation and clutching of motor 12 to appliance input pulley P, a tensioning pulley 42 is provided. Pulley 42 includes tensioning apparatus 44 for pivotally mounting pulley 42 to appliance B, which tensioning apparatus 44 includes a mounting flange 46 and a handle 48 for pivoting pulley 42 about an arc. Structure of tensioning apparatus 44 is of any well known arrangement, and pivoting increases and relaxes belt tension in conventional manner.

Figure 3:
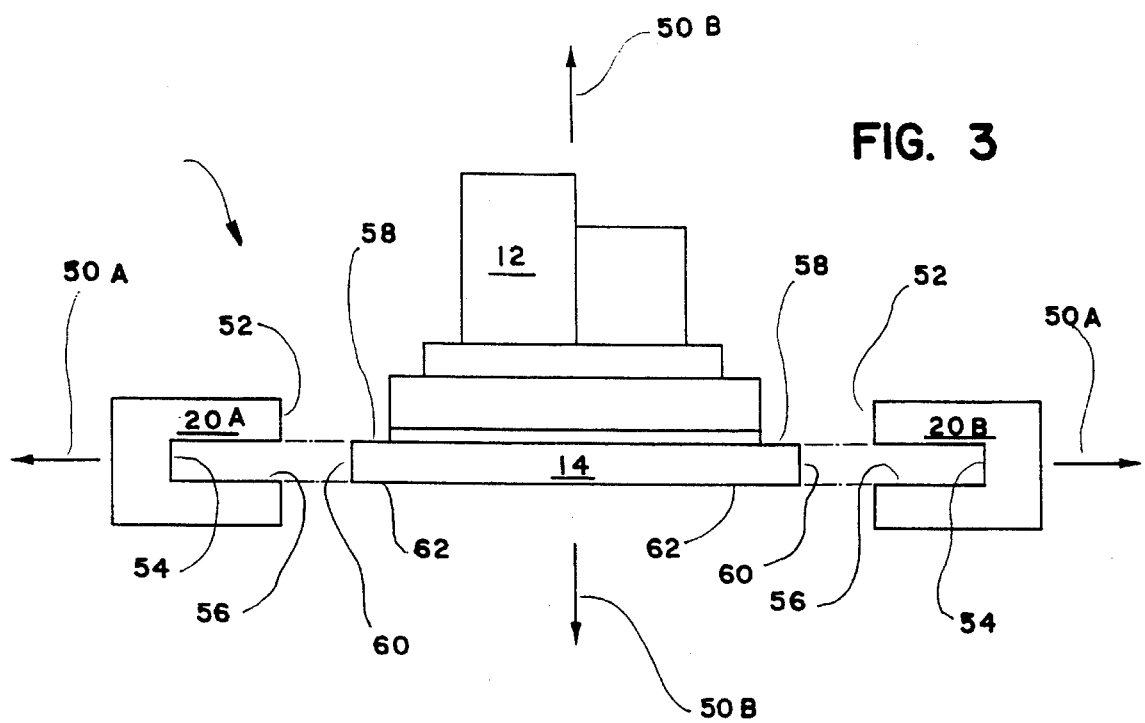
FIG. 3 is a diagrammatic, exaggerated, front elevational detail view showing cooperating structure of the flange and its associated bracket.

In either embodiment, and as illustrated in FIG. 3, bracket 20 surrounds flange 14 so as to prevent movement of flanged motor 12 along either of the two orthogonal axes 50A, 50B. In FIG. 3, bracket members 20A, 20B are shown spaced apart in exaggerated fashion, in order to call attention to surfaces 52, 54, 56 formed in bracket 20. Surfaces 52, 54, 56 are each parallel to and, collectively, cooperate with, corresponding surfaces 58, 60, 62 formed in flange 14. Of course, in its true configuration, bracket 20 closely surrounds flange 14.

Flanged motor 12 can slide only axially, with respect to its output shaft 18, when engaging bracket 20. Interference of flange 14 with bracket 20 stops flanged motor 12 prior to contacting input shaft S. This spares both motor 12 and input shaft S, and associated apparatus (not shown), damage which might arise from impact.

Surfaces 52, 54, 56 of bracket 20 are both straight and parallel to cooperating surfaces 58, 60, 62 of flange 14. This is important, since this arrangement enables flanged motor 12 to be slid in a single motion directly into operative position without precise maneuvering, and because torsion, which might otherwise cause misalignment of output shaft 18 and input shaft S, is thereby controlled. Forces acting in the axial direction will be of small magnitude, and easily resisted by pins 24, 24.

Figure 4:
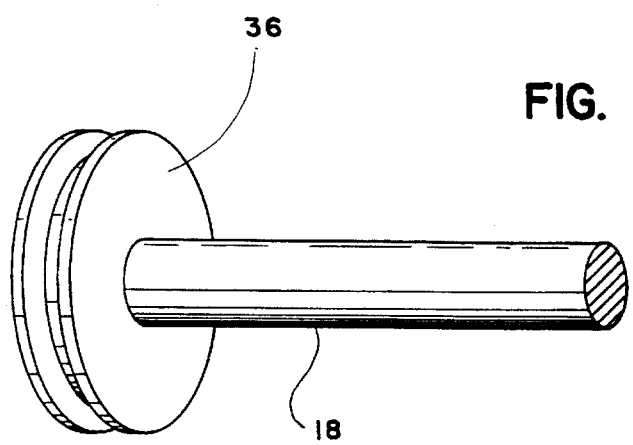
FIG. 4 is a perspective detail view of an alternative embodiment motor output/shaft having a pulley.

In a further embodiment wherein appliance B includes a belt drive D, and as seen in FIG. 4, it would be possible to attach drive pulley 36 directly to motor output shaft 18. This arrangement simplifies successive installation of motor 12 in plural belt driven appliances B. In this embodiment, separate pillow block bearing 38 (see FIG. 2) is eliminated. Belt tensioning pulley 42 (also seen in FIG. 2) is still optionally used.

Other torque transmitting connectors supplanting connector 26 will now be discussed. As seen in FIG. 5, a coupling 64 designed to accommodate mild axial and angular misalignment may be employed to connect shafts 18 and S. This type of coupling has right and left mating members 66, 68, and a resilient, cooperating member 70 sandwiched therebetween. Coupling 64 is locked to the shafts 18, S by inserting a key 72 in cooperating keyways 74, 76, by turning a setscrew 78 through coupling 64 into keyway 74, or by any other suitable method for enabling coupling 64 to engage shafts 18 and So Although only member 66 is shown to have a keyway and setscrew, member 68 must obviously be provided with at least one of keyway 76 and setscrew 78 to assure engagement of shaft S. It will further be appreciated that engagement signifies that shafts 18 and S, and coupling 64, are mutually connected so as to transmit rotary power applied to shaft 18 by motor 12 (see FIG. 1).

FIG. 6 shows another form of connector, comprising a splined collar 80. Shafts 18 and S have cooperating splines, and splined collar 80 straddles both shafts 18,S when connected. If desired, axial travel of collar 80, resulting in withdrawal from operative engagement of shaft 18 or S, may be prevented by pinning collar 80 to shaft 18 or S, in the manner of collar 26 (see FIG. 1). If employed for this purpose, only one pin need be provided. A setscrew arrangement, as shown in FIG. 5, may also be employed to maintain collar 80 in position.

FIG. 7 illustrates an embodiment wherein harshness of engagement is mitigated, and a control feature is provided. One shaft 18 or S is provided with a centrifugal clutch 82, and the other shaft is provided with a cooperating drum 84. These components 82, 84 are solidly secured to their respective shafts 18 or S. At a predetermined speed, a member of clutch 82 projects radially therefrom, thus engaging drum 84. The appliance is driven above this predetermined motor rotational speed. Below this speed, clutch 82 releases drum 84. This control feature provides a convenience, such as enabling engine idling while not driving the appliance. Release during idling may also serve as a safety feature.

Again referring to FIGS. 1 and 2, a readily installed and removed engine mounting 10 is thus provided which requires no more than four manually inserted and withdrawn pins 24, 24, 32, 32 to effect secure, operable attachment of motor 12 to appliance A or B. Once motor bracket 20, and, if required, bearing bracket 40 and tensioning apparatus flange 46 are installed, motor 12 is easily installed in and removed from an appliance A or B. Collar 26, where used, and pins 24, 24 and 32, 32 are easily retained with motor 12 by inserting the same into holes 22, 22 and 34, 34, so that motor 12 can be carried about and attached to a different appliance A or B.

It is to be understood that the present invention is not limited to the embodiments described above, but encompasses any and all embodiments within the scope of the following claims.

I claim:

1. Apparatus for interchangeably powering an appliance, wherein the appliance has an input shaft for receiving a rotary power input, said apparatus comprising:

a motor having an output shaft for supplying a rotary power input, and a flange fixed to said motor for securement of said motor to the appliance;

a bracket attachable to the appliance in a predetermined, fixed location, for engaging said flange in a manner constraining said motor against rotation about the axis of said motor output shaft, and constraining said motor against movement in a radial direction with respect to said axis of said motor output shaft, said bracket permitting movement of said motor in a direction coincident with said axis of said motor output shaft;

a stop preventing contact of said motor output shaft with the appliance input shaft when said motor is moved into operative position on the appliance;

manually installed and removed connectors locking said flange to said bracket when said motor is located in said operative position; and a separable coupling movable to a position engaging both said motor output shaft and the appliance input shaft, thereby drivingly coupling said motor output shaft and the appliance input shaft.

2. The apparatus according to claim 1, said separable coupling comprising a first component fixed to said motor output shaft, and a second component fixed to the appliance input shaft, said first and second components of said separable coupling arranged concentrically, one of said first and second components surrounding the other of said first and second components.

3. The apparatus according to claim 1, wherein said first and second components of said separable coupling have means for engaging one another by interference.

4. The apparatus according to claim 1, wherein said separable coupling comprises a centrifugal clutch.

5. The apparatus according to claim 1, wherein the appliance input shaft includes an input pulley, a drive pulley, and a belt drive operably engaging said input pulley and said drive pulley, whereby rotary power is transmitted from said motor output shaft through the drive belt.

6. The apparatus according to claim 5, further including a tensioning pulley to increase and relax tension selectively on the drive belt when said motor is running.

7. The apparatus according to claim 1, wherein one of said flange and said bracket surrounds the other of said flange and said bracket on three sides, thus immobilizing said flange and said bracket against mutual separation in two orthogonal axes.

8. The apparatus according to claim 7, wherein said flange includes at least one straight surface and said bracket includes at least one cooperating straight surface, whereby said flange is slid linearly into engagement with said bracket to an operative position with respect thereto.

9. The apparatus according to claim 1, wherein said separable coupling comprises a splined collar.

10. The apparatus according to claim 1, wherein said separable coupling comprises right and left mating members, and a resilient, cooperating member sandwiched between said right and left mating members, said separable coupling further comprising means for engaging said motor output shaft and the appliance input shaft.

* * * * *